Dec. 20, 1938.  C. W. MEININGER  2,140,590
DUMP TRUCK BODY
Filed Feb. 8, 1937  2 Sheets-Sheet 2
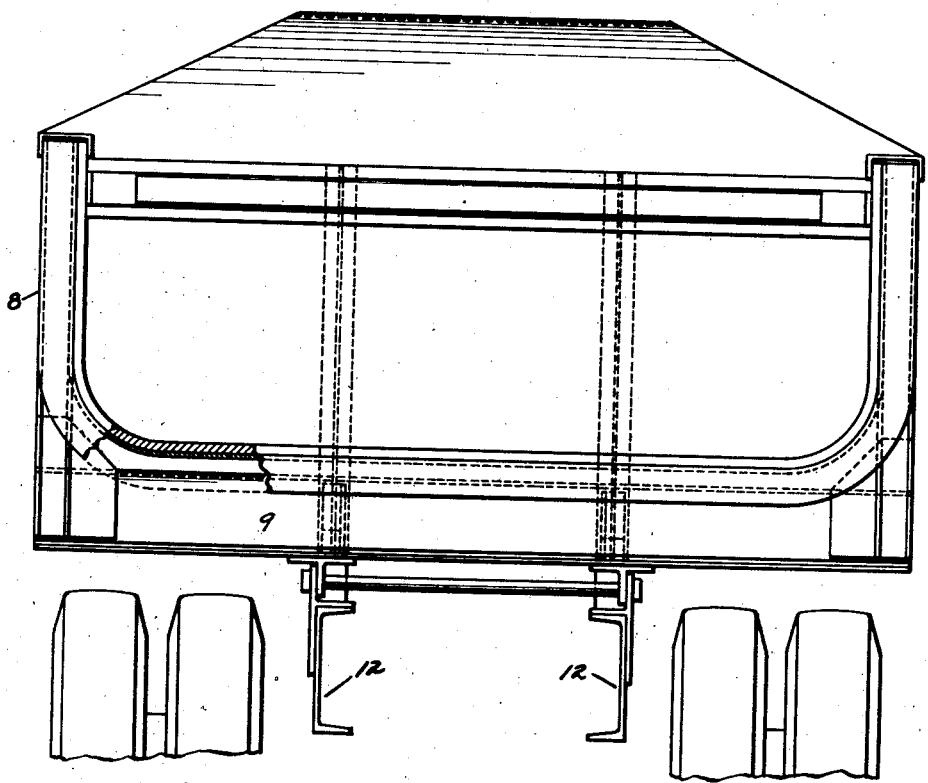
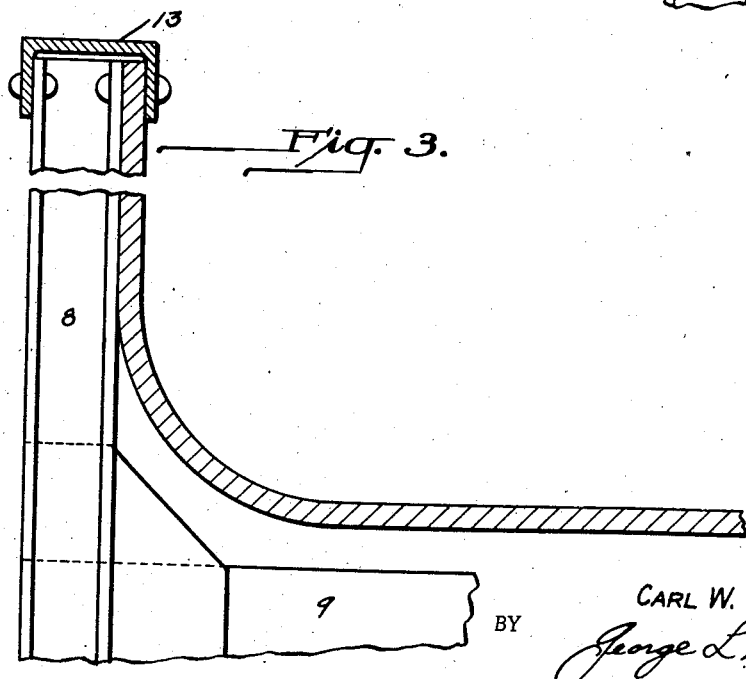
INVENTOR.
CARL W. MEININGER.
BY George L. Wallace
ATTORNEY.

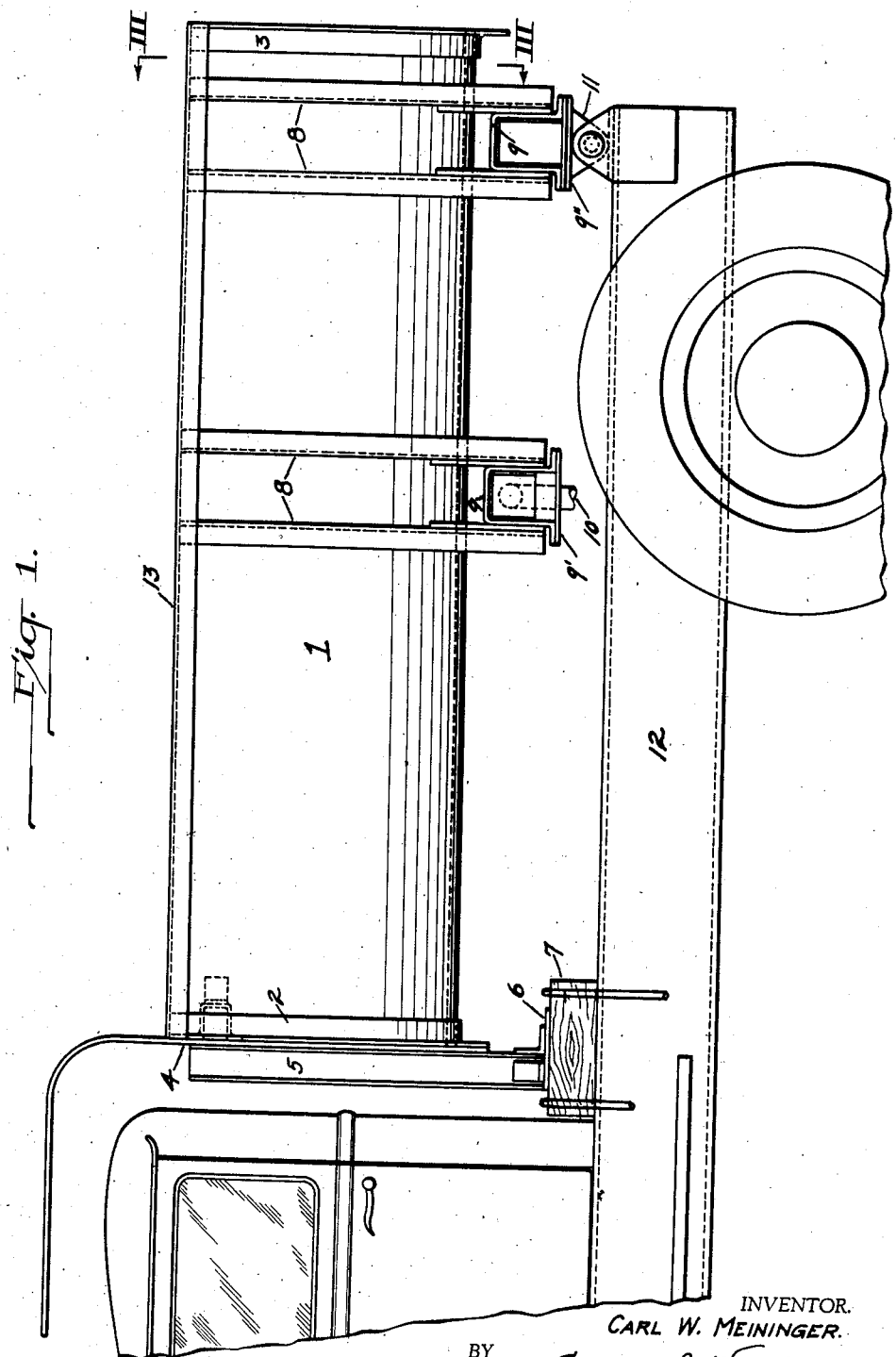

Patented Dec. 20, 1938

2,140,590

UNITED STATES PATENT OFFICE 2,140,590

DUMP TRUCK BODY

Carl W. Meininger, New Kensington, Pa., assignor to Aluminum Company of America, Pittsburgh, Pa., a corporation of Pennsylvania Application February 8, 1937, Serial No. 124,605

2 Claims. (Cl. 296—28)

This invention relates to dump bodies for motor trucks and the like, and specifically to bodies that are fabricated from sheet metal.

It has been the desire of builders and users of trucks to keep to a minimum the weight of these units, commensurate, of course, with serviceability, so that the so-called "pay load" may be increased. The primary object of this invention is the provision of a truck body in which the commonly used longitudinal and transverse beams are eliminated and in which the floor will be free to flex under impact, thereby appreciably absorbing the force of impact itself before the same is transmitted to the vehicle springs.

Another object of the invention is to provide a truck body in which the load forces are carried to vertical members by the body itself, and from the vertical members to the chassis without employing transverse members which are in contact with the body.

These and other objects of my invention will be apparent from the specification when read in connection with the drawings, in which:

Fig. 1 depicts a side view of a conventional motor truck having a suspended body;

Fig. 2 is an end view of the body showing a part of the chassis;

Fig. 3 is a view taken on line III—III of Fig. 1.

Referring to the drawings, wherein similar characters of reference denote like parts throughout, numeral 1 designates a dump truck body, the shell of which may be made of a single sheet of metal or which may be a built-up structure, in that it will have a bottom which is riveted or otherwise secured to vertical side members. In the drawings, the body is shown as having a relatively flat bottom. However, the invention covers either single or built-up sheet bodies in which the bottoms are made with a pre-formed curvature, for use with static loads where there is less likelihood of having to absorb forces of substantial impact other than those occasioned in the normal use of the vehicle.

The body is riveted to and reinforced by members 2 and 3, which are preferably structural shapes, such as heavy angles, formed to fit the contour of the body shell. A front end plate 4 is riveted to member 2, and one or more vertical members 5 are secured to said end plate. These vertical members are preferably of I-beam construction and extend appreciably below the bottom of the truck body. A plate 6 is joined to the bottom of each vertical member 5. A force absorbing block 7 is secured on each side of the chassis by U-bolts or other suitable means, and serves to distribute the various forces transmitted thereto by the plates 6. The end plate 4, as shown, extends upwardly and is bent forward to provide a hood for protection of the truck cab. Along the length of the body, vertical members 8 are located. These members are preferably channels and are riveted to the body shell. In this connection, it should be noted that the plates forming the sides of the body are riveted to members 8, from a point appreciably above the curved portion of the body between the sides and the bottom. The members 8 are gusseted to cross members 9, as shown in Fig. 2, the cross members 9, however, being an appreciable distance below the bottom of the truck body, so that the bottom does not rest upon them. Intermediate each pair of verticals 8 and extending across the width of the truck body are the above mentioned cross members 9, one of these members with its tie bar 9' providing a bearing surface for the hoist 10, the other member with its tie bar 9" providing a bearing surface for the member 11, about which the body pivots as it is raised. The standards of member 11 are secured to the chassis frame 12.

Cap-shaped members 1°, as best shown in Fig. 3, extend along both top lengthwise edges of the body. These members fit over and are riveted to the body sides and vertical members 8, thereby further unitarily joining the sides of the body to their verticals. It will thus be apparent that this construction leaves the body suspended between the verticals 8 and absolutely free of any contact with the ordinary longitudinal and transverse beams which are found in most truck body constructions today. It will also be apparent that should the truck body be subjected to a force such as one of impact, the force will be partially absorbed by the flexibility of the bottom at the moment of impact, and that which remains will be transmitted to the chassis frame only through the vertical members 5 and through the rear pair of vertical members 8 and the transverse member 9 gusseted thereto which is not in contact with the body bottom.

No tail gate has been shown in the drawings, but it is obvious that any suitable type of tail gate may be used.

While the invention has been described hereinabove with reference to certain embodiments thereof which are now preferred, it will be understood that it may be otherwise embodied without departing from the spirit of the invention or the scope of the appended claims.

I claim:

1. A truck body comprising a bottom and side walls of sheet metal, said bottom being curved upwardly at the side extremities thereof to form vertical side walls, said walls being secured throughout a substantial portion of their depths to chassis supported vertical members whereby load forces on the body are transmitted to the truck chassis entirely by said vertical members.

2. In combination with a truck chassis, a body comprising a bottom and side walls of sheet metal, said sheet metal bottom being supported solely by said side walls, said side walls being secured to vertical members throughout a substantial portion of their depth, and being supported on said chassis through said vertical members with said bottom free of the chassis, whereby said bottom is free to flex under load.

CARL W. MEININGER.